(12) United States Patent
Mazzoni (10) Patent No.: US 8,517,049 B2
(45) Date of Patent: Aug. 27, 2013

(54) PRESSURE RELIEF VALVE (75) Inventor: Matteo Mazzoni, Reggio Emilia (IT)

(73) Assignee: Walvoil S.p.A., Reggio Emilia (RE) (IT)

( * ) Notice: Subject to any disclaimer, the term of this patent is extended or adjusted under 35 U.S.C. 154(b) by 332 days.

(21) Appl. No.: 13/002,711

(22) PCT Filed: Jul. 8, 2009

(86) PCT No.: PCT/IB2009/052964
§ 371 (c)(1),
(2), (4) Date: Jan. 5, 2011

(87) PCT Pub. No.: WO2010/004511
PCT Pub. Date: Jan. 14, 2010

(65) Prior Publication Data
US 2011/0114203 A1    May 19, 2011

(30) Foreign Application Priority Data
Jul. 8, 2008   (IT) .............................. PR2008A0041

(51) Int. Cl.
*F16K 17/20*    (2006.01)
(52) U.S. Cl.
USPC ............................................ 137/469; 251/50
(58) Field of Classification Search
USPC ................ 137/469, 514.5, 514, 455; 251/50, 251/52
See application file for complete search history.

(56) References Cited

U.S. PATENT DOCUMENTS

| 2,600,875 | A |   | 6/1952  | Hrdlicka |
|-----------|---|---|---------|----------|
| 2,630,825 | A | * | 3/1953  | Stephens ........................ 137/494 |
| 3,036,593 | A | * | 5/1962  | Saville ........................... 137/469 |
| 3,054,420 | A | * | 9/1962  | Williams ....................... 137/469 |
| 3,217,740 | A | * | 11/1965 | Vick .............................. 137/469 |
| 3,465,778 | A | * | 9/1969  | Kast ........................... 137/115.1 |
| 3,592,223 | A | * | 7/1971  | Reese ........................... 137/469 |
| 3,608,859 | A |   | 9/1971  | Hetzer |
| 5,050,636 | A | * | 9/1991  | Sagawa et al. ................ 137/494 |
| 5,590,683 | A | * | 1/1997  | Bennett ...................... 137/454.5 |
| 7,077,157 | B2 * | 7/2006 | Cavagna ...................... 137/491 |
| 8,281,804 | B2 * | 10/2012 | Lin et al. .................... 137/514.5 |

OTHER PUBLICATIONS

International Search Report, dated Oct. 30, 2009, from corresponding PCT application.

* cited by examiner

*Primary Examiner* — John Rivell
*Assistant Examiner* — Umashankar Venkatesan
(74) *Attorney, Agent, or Firm* — Young & Thompson (57) ABSTRACT

An adjustable pressure relief valve for use in hydraulic circuits, particularly for controlling pressure transients—acceleration and deceleration—of hydraulic motors subject to inertia forces (progressive anti-shock pressure relief valves) is characterized by reduced leakage, involving a reduced influence of flow forces during valve control, as well as reduced pressure losses; these characteristics prevent the hydraulic motor from rotating when it is subject to a drive load and is not powered, eliminate vibrations and instability of valve-regulated pressure, especially at low flow rates, and ensure an adjustment value varying according to the flow rate through the valve. A further characteristic of the valve is the reduced number of its components, resulting in greater cost effectiveness.

10 Claims, 6 Drawing Sheets

PRESSURE RELIEF VALVE

BACKGROUND OF THE INVENTION

1. Field of the Invention

The present invention relates to the field of adjustable pressure relief valves for use in hydraulic circuits, particularly for controlling pressure transients—acceleration and deceleration—of hydraulic motors subject to inertia forces (progressive anti-shock pressure relief valves).

2. Description of the Related Art

Adjustable pressure relief valves are widely used in the art.

Such pressure relief valves have the purpose of damping regulating pressure increases by compressing a main spring via a spring pressing member actuated by the pressure of hydraulic fluid carried from the feed line into a chamber above it. An adjusting spring is also mounted in such chamber, for downwardly pressing the movable member within the pressure relief valve; the force with which such adjusting spring operates on the movable member may be adjusted by operating an adjustment means situated outside the valve.

Thus, the valve may be easily adjusted.

The main drawback of the prior art is that, due to considerable leakages, these valves mounted to hydraulic motors with transient control and anti-shock purposes cannot prevent the hydraulic motor from rotating when it is subject to a driving load and is not powered; therefore, additional motor braking systems shall be provided to prevent load displacement while the machine in which the motor is mounted is still.

A further drawback of prior art pressure relief valves is their complex construction architecture and the large number of their components.

SUMMARY OF THE INVENTION

The object of the present invention is to provide a leak-proof valve that can solve the above mentioned leakage problems, without providing additional motor braking systems.

A further object of the present invention is to provide a valve whose construction architecture can reduce the influence of flow forces generated during adjustment and reduce pressure losses, thereby providing adjustment values varying to a reduced extent with the flow rate through the valve, and eliminate vibrations and instability of regulated pressure.

Also, such construction architecture has the advantage of reducing the number of the valve components, for easier assembly and lower costs thereof.

These objects and advantages are achieved by the progressive pressure relief valve of the present invention.

BRIEF DESCRIPTION OF THE DRAWING FIGURES

These and other characteristics will be more apparent from the following description of a few embodiments, which are shown by way of example and without limitation in the accompanying drawings, in which.

DETAILED DESCRIPTION OF THE INVENTION

Figure 1:
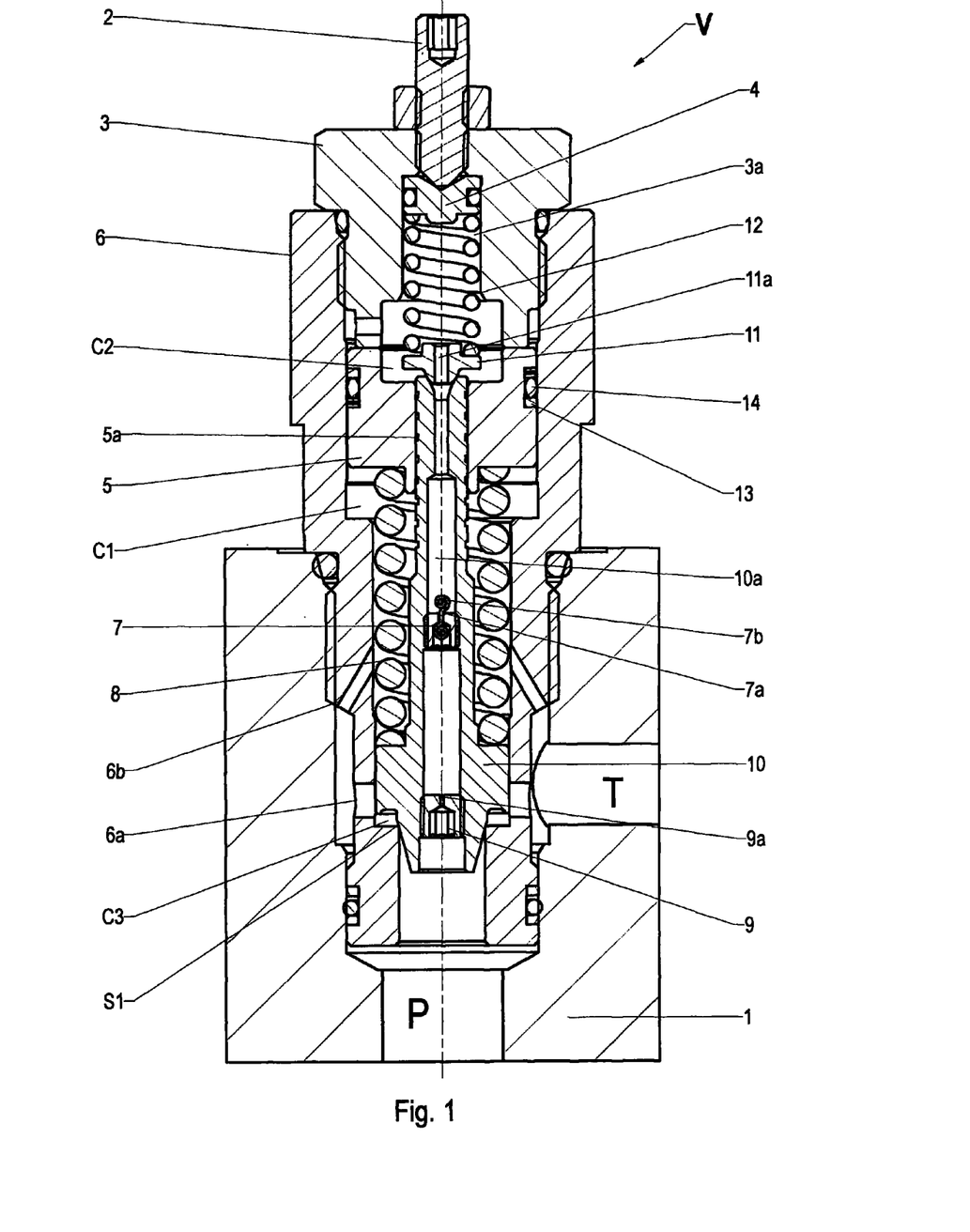
FIG. 1 is a sectional view of a first embodiment of the pressure relief valve of the present invention.

Referring to FIG. 1, the characteristics and operation of a first preferred embodiment of the valve V of the present invention will be now described.

The valve V consists of an internally hollow cartridge 6, with a spring-holding plug 3 screwed to its upper end; a ring of radial through holes 6a and one or more holes 6b are formed in the cartridge 6.

The cartridge 6 contains a closure member 10 with an axial through hole 10a, a main spring 8, a piston 5 with an axial through hole 5a, a setting spring 12 and a plate 11 with an axial through hole 11a interposed between the spring 12 and the closure member 10.

In a preferred construction embodiment, two calibrated throttles 7 and 9 are mounted in the closure member 10, which throttles are disposed in series and have respective calibrated holes 7a and 9a; such throttles may be equipped with a steel music wire 7b to prevent clogging of the calibrated holes.

In a further construction embodiment, there may also be a single throttle with a calibrated hole of smaller diameter.

In yet another construction embodiment, the calibrated holes (7a, 9a) may be replaced by a compensated flow-rate regulator, appropriately sized to ensure a constant flow rate regardless of the pressure within the feed line P through the hole 10a.

Figure 4:
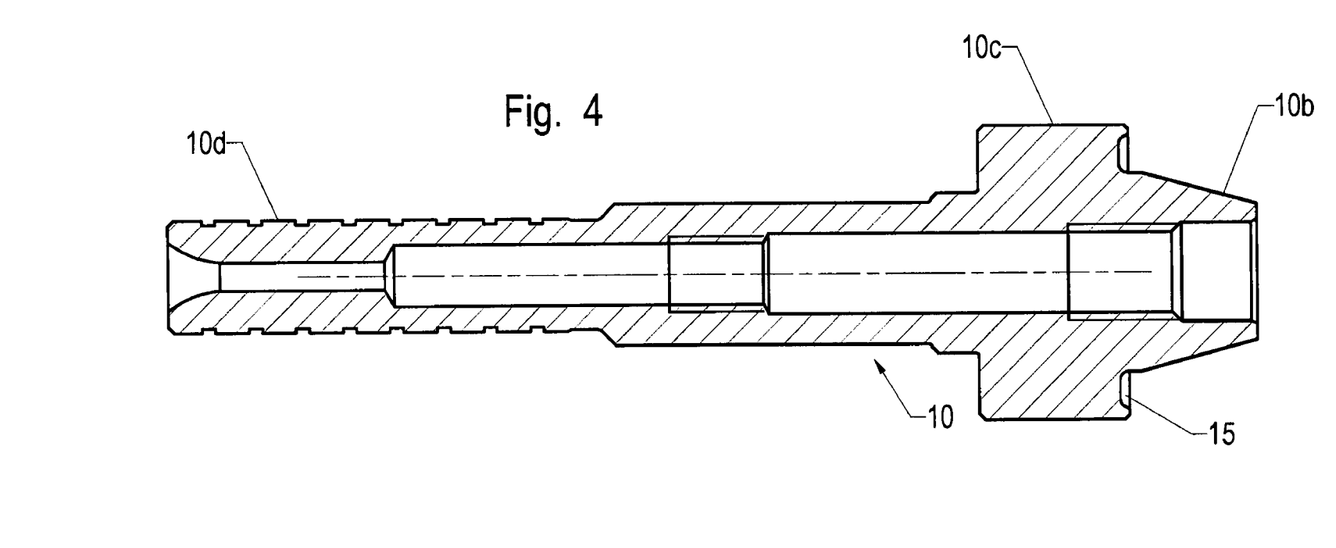
FIG. 4 is a detailed view of the closure member within the pressure relief valve of the present invention.

As show in greater detail in FIG. 4, the closure member 10 is composed of portions having different shapes: a head 10b, whose frustoconical shape and geometric precision can ensure tightness of the inner edge S1 of the cartridge 6; a cylindrical surface 10c that can axially slide with a few millimeters clearance along the inner surface of the cartridge 6; a central part and an end part 10d having a cylindrical shape but a smaller diameter for a main spring chamber C1 to be defined by the inner surface of the cartridge 6, the outer surface of the closure member 10 and the bottom surface of the piston 5.

When the valve is at rest, the main spring chamber C1 is maintained at the pressure of the discharge line T by one or more holes 6b formed in the cartridge 6.

The head 10b of the closure member 10 is characterized by the presence of a baffle 15 which appropriately directs the hydraulic fluid to reduce the influence of the flow forces generated as fluid flows from the feed line P to the discharge line T; the baffle 15 is an annular discharge formed by mechanical machining at the base of the frustoconical head 10b of the closure member 10.

The surface 10c of the closure member mates with the inner surface of the cartridge 6 and, due to the high degree of geometric precision with which the surface 10c of the closure member and the inner surface of the cartridge mate, no fluid leakage actually occurs between such contact surfaces.

As a result, the flow rate of the fluid that leaks between the chamber C1 and the chamber C3 (the latter being defined by the baffle 15 and the edge S1 of the cartridge 6) is much lower than the flow rate of fluid that can leak between the chamber C1 and the discharge line T through the holes 6b, and pressures in the chambers C1 and C3 are independent from each other.

Also, the surface 10c of the closure member has such a size as to leave a portion of the ring of holes 6a exposed as the valve closes; this arrangement reduces pressure losses and prevents vibrations and instability of the regulated pressure, especially at low flow rates.

The flow through the valve from the feed line P to the discharge line T increases pressure in the chamber C3 to a value above the pressure in the chamber C1 due to the holes 6a that are partly obstructed by the surface 10c of the closure member 10, which generates an additional thrust upon the closure member 10, that helps to overcome the force of the springs 8 and 12. The end part 10d of the closure member 10 is held within the hole 5a of the piston 5; the section along which the hole 5a and the end part 10d of the closure member mate is designed with such a length and geometric precision, as to obtain actually no leakage or a leakage lower than 5 ml/min, at the operating pressure of the valve, between such contact surfaces.

The piston 5 can axially slide within the cartridge 6; due to the high degree of geometric precision with which the outer surface of the piston 5 and the inner surface of the cartridge 6 mate and to the addition of the seals 13 and 14, no fluid leakage actually occurs between such contact surfaces.

Figure 2:
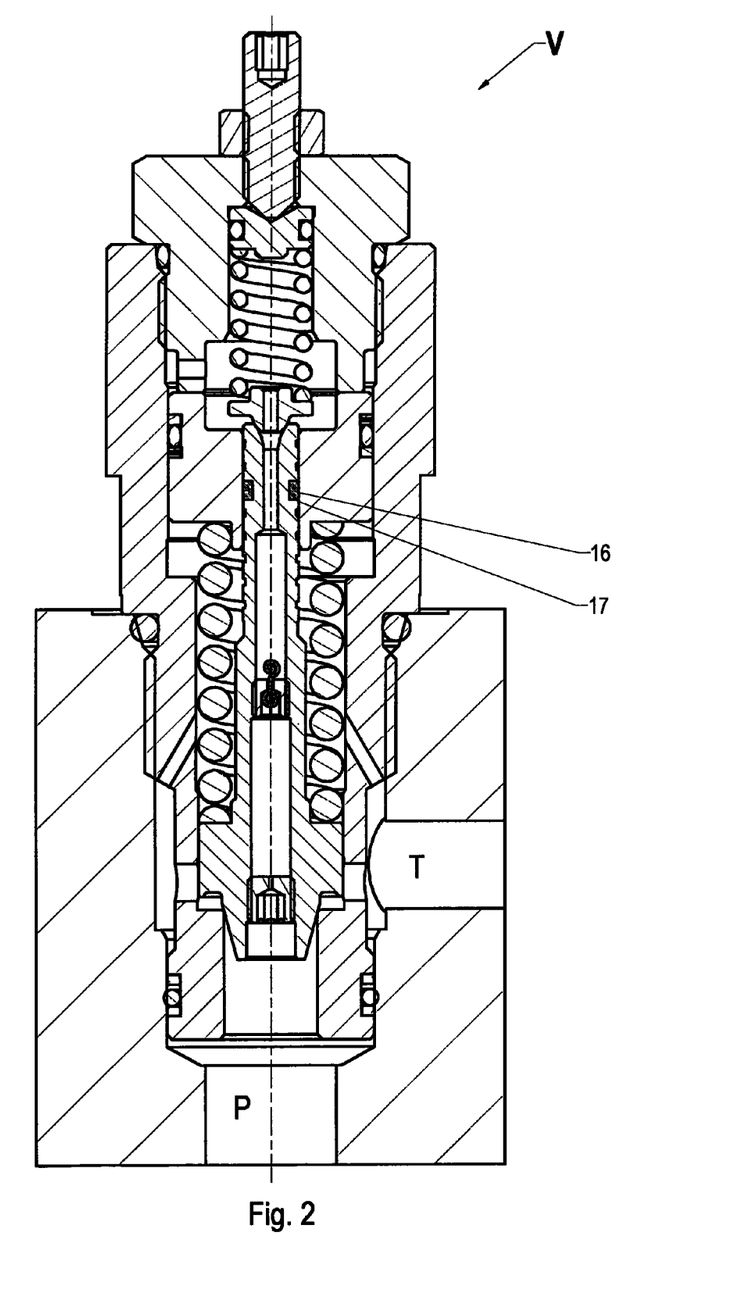
FIG. 2 is a sectional view of a second embodiment of the pressure relief valve of the present invention.

In the second embodiment of the valve V of the present invention, as shown in FIG. 2, an optimized sealing effect may be obtained between the mutually mating hole 5a and the end part 10d of the closure member 10 by forming an annular groove 17 in this portion, with a low friction seal 16 therein.

Figure 3:
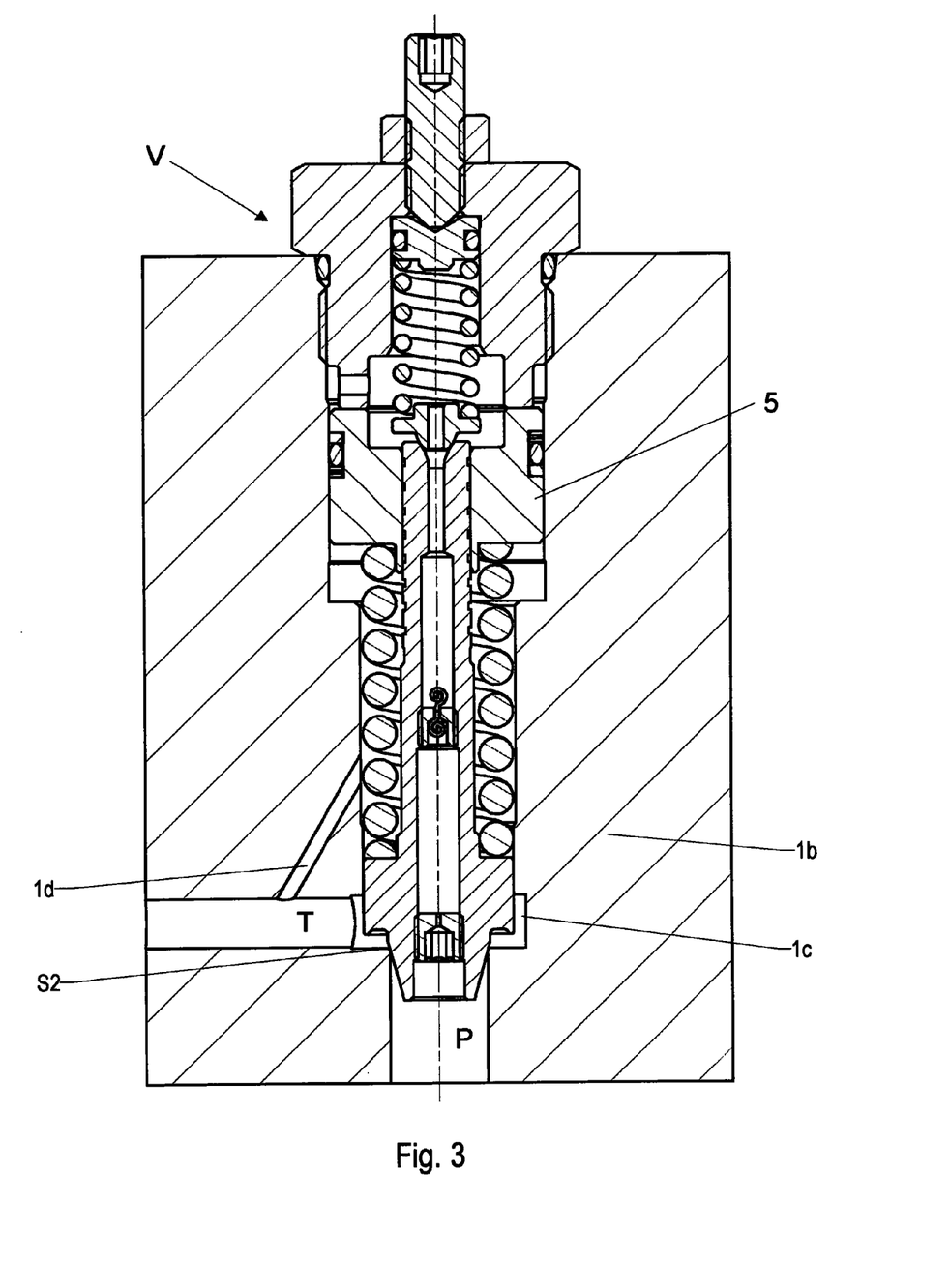
FIG. 3 is a sectional view of a third embodiment of the pressure relief valve of the present invention.

In the third embodiment of the valve V of the present invention, as shown in FIG. 3, the cartridge 6 is omitted and its components are directly mounted to a specially machined body 1b; the holes 6b formed in the cartridge 6 are replaced by holes 1d directly formed in the body 1b and the ring of holes 6a is replaced by an annular recess 1c formed in the discharge line T.

The head 10b of the closure member 10 seals against the edge S2 which is also obtained by direct machining in the body 1b.

As a result of the characteristics of these three embodiments:
the chamber C1 and the chamber C2, defined by the spring holder 3 and the piston 5 are isolated from each other;
the chamber C1 and the feed line P are isolated from each other when the valve is closed.

The spring holder 3 has an adjustment screw 2 mounted at one end thereof and an inner cavity 3a in which a spring plate 4 and a setting spring 12 may be received. The setting spring 12 presses the end part of the closure member 10, through the plate 11, towards abutment of the head 10b against the edge S1 and presses the spring plate 4 against the adjustment screw 2. As a result, the adjustment screw 2 may be used to adjust the force with which the closure member 10 is pressed against the edge S1.

The valve V is closed until the force generated by the pressure of the hydraulic fluid in the feed line P is lower than the force with which the closure member 10 is pressed against the edge S1 or the edge S2, which force is given by the preload of the main spring 8 and the preload of the setting spring 12; in this condition the chamber C3 is separated by the feed line P and the surface 10c of the closure member leaves a portion of the ring of holes 6a of the cartridge 6 or the annular recess 1c in the body 1b exposed.

When the pressure generated by the hydraulic fluid in the feed line P and exerted on the head 10b of the closure member 10 exceeds a predetermined value, the assembly composed of the closure member 10 and the plate 11 moves upwards; a passage is formed between the head 10b of the closure member and the edge S1 of the cartridge 6 or edge S2 of the body 1b, to allow part of the fluid in the feed line P to flow into the chamber C3 and then, through the ring of holes 6a or the annular recess 1c, into the discharge line T.

Another part of the hydraulic fluid in the feed line P flows through the holes 10a and 11a and through the calibrated holes 9a and 7a of the throttles 7 and 9, into the chamber C2; the action of this fluid causes the piston 5 to move downwards and press the main spring 8, thereby increasing the regulating pressure.

As the piston 5 moves down, the fluid in the chamber C1 is pressed into the discharge line T through the holes 6b; in this condition, pressure in the chamber C1 increases and opposes the downward motion of the piston 5, which is thus slowed down. The size of the holes 6b or 1b is one of the valve operation time control parameters.

Figure 5:
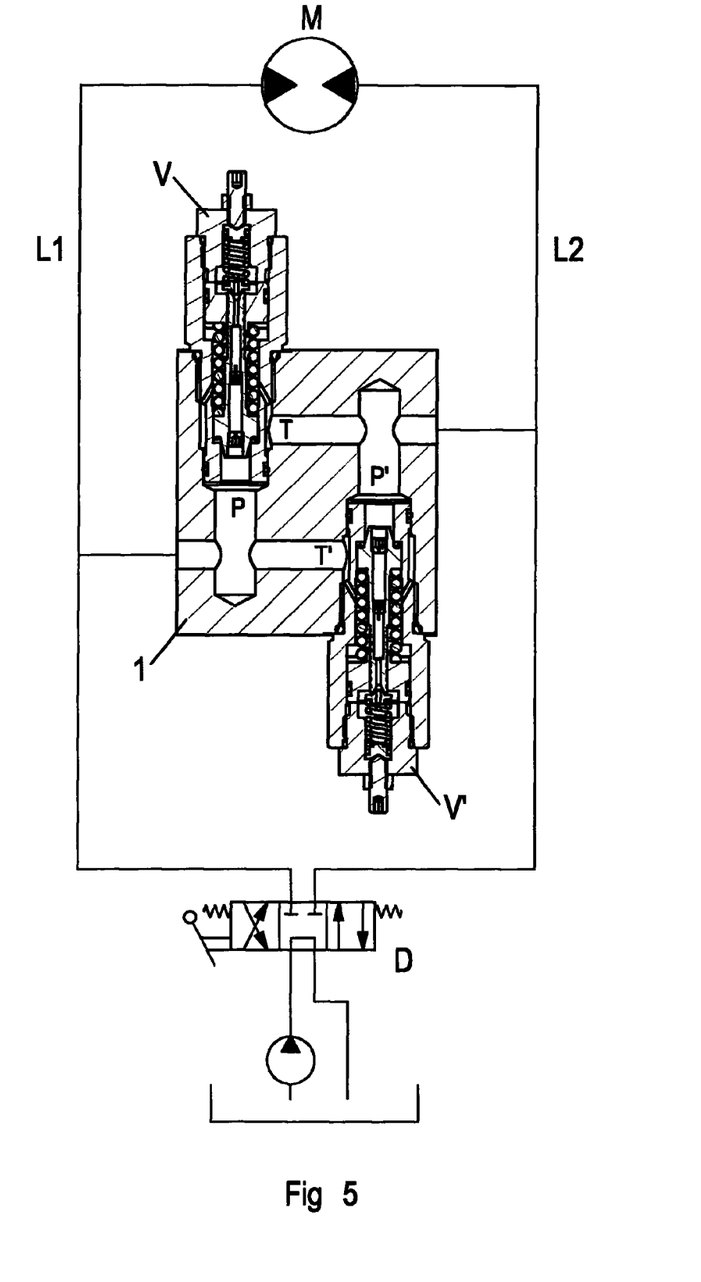
FIG. 5 is an exemplary view of the hydraulic circuit in which the pressure relief valve of the present invention is usually used.

Referring to FIG. 5, an exemplary hydraulic circuit, in which the pressure relief valve of the present invention is usually used, will be now described. Two pressure relief valves V and V1 are usually mounted to the body 1 or 1b of a hydraulic block; the valve V is in communication with a feed line P and a discharge line T and the valve V' is in communication with a feed line P' and a discharge line T', formed in the body 1 or 1b. The body 1 or 1b is also internally machined for the feed line P to be in communication with the discharge line T' and for the feed line P' to be in communication with the discharge line T. The hydraulic block 1 or 1b is incorporated in a hydraulic circuit comprising a directional control valve D and a motor M connected together by the hydraulic lines L1 and L2.

Due to the presence of the pressure relief valves V and V' of the present invention, when the control valve D is driven to impart a rotary motion to the motor M, a damped, gradual acceleration is obtained; conversely, when the control valve D is driven to abruptly stop the flow to the motor M, the latter tends to maintain its own rotational speed due to the inertial load connected thereto. The fluid that comes out of the motor M cannot flow through the directional control valve D and increases pressure in the line L1 or L2, according to the direction of rotation, until the set pressure for the valve V or V' is reached; this causes the valve to open and the fluid to recirculate on the opposite hydraulic line L2 or L1. As fluid passes through the valve V or V', it undergoes a pressure loss by energy dissipation, and allows gradual deceleration of the motor M until the latter stops, without requiring any additional braking system in the circuit.

The valves V and V' are designed to operate at a low pressure value, and to gradually increase such set pressure to a final higher value in a predetermined time, which provides damped, gradual acceleration and deceleration transients of the motor M. When the directional control valve is driven to stop the flow to the motor M, the valves V and V' ensure negligible leakages between the lines L1 and L2 and thus prevent any rotation of the motor M, even when the latter is subject to and tends to be driven by external loads.

Figure 6:
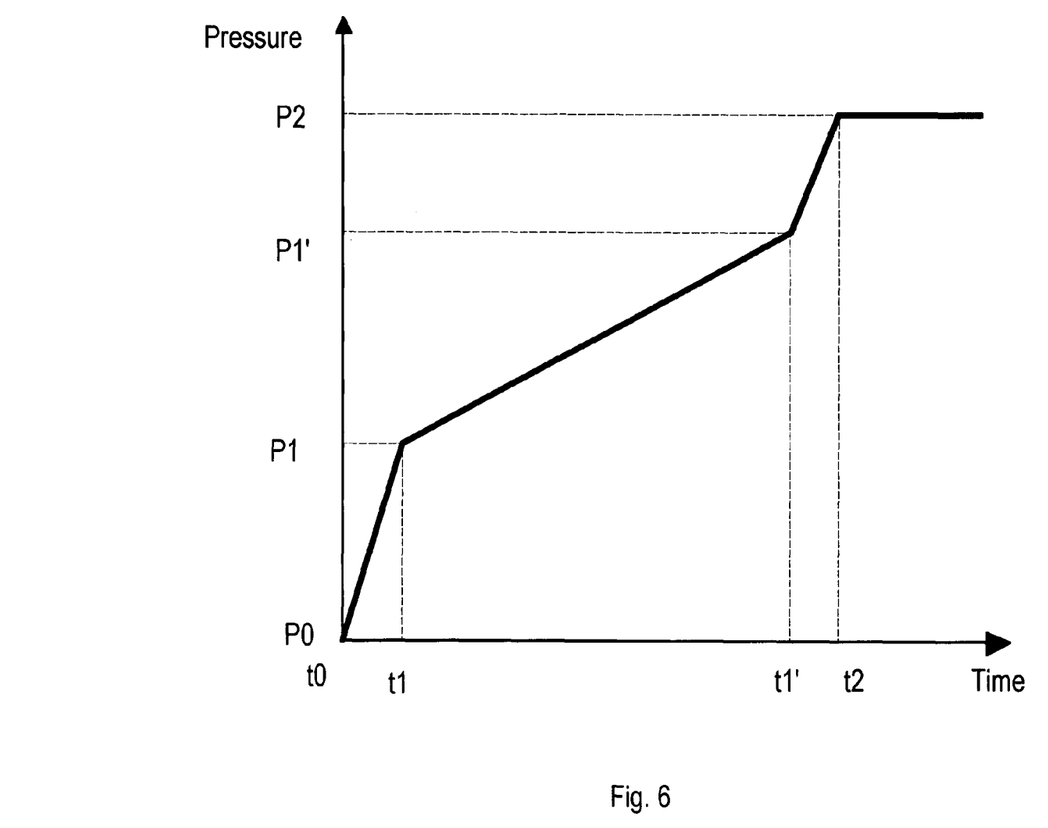
FIG. 6 shows a typical curve of regulated pressure as a function of time, during operation of the pressure relief valve of the present invention.

The above described operation may be effectively represented by the typical curve of the regulated pressure as a function of time during valve operation, as shown in FIG. 6. From the time at which pressure starts to operate on the feed line P, pressure increases to the value P1 at time t1, whereupon the closure member 10 starts to partially open the fluid passage between the feed line P and the chamber C3 and from the latter through the ring of holes 6a or the recess 1c to the discharge line T; in this first step fluid passes through the holes 7a, 9a and 10a and reaches the chamber C2. From the time at which a pressure value is reached in the chamber C2, which generates a force that can displace the piston 5 (time t1), pressure in the chamber C2 remains substantially unchanged until time t1'; from time t1 to t1', the piston 5 translates and increases the preload of the main spring, thereby increasing the preload of the main spring 8 and hence the force required to lift the closure member 10, i.e. the pressure in the feed line P increases the value P1 to P1'. At time t1', the piston 5 reaches an abutment and the pressure value P1' is reached, from now on pressure increases in the chamber C2 until, at time t2 a final pressure value P2 is reached in the feed line P; this pressure value P2 is then maintained unchanged with time as long as there is flow from the feed line P to the discharge line T. The calibrated holes 7a and 9a can control the time required for the piston 5 to run its stroke to the abutment; this allows adjustment of the operation time (t2-t0) of the present valve, by only making changes to the calibrated throttles 7 and 9. During this adjustment step, the size of the head 10b of the closure member and the presence of the baffle 15 reduce the influence of flow forces and pressure losses, eliminate vibrations and stabilize the regulated pressure at low flow rates.

The pressure relief valve of the present invention provides a number of advantages over prior art pressure relief valves:

The chamber C1, the chamber C2 and the chamber C3 are wholly isolated from each other: the presence of the chamber C3, as well as the geometry of the baffle 15 on the closure member 10 can provide a sufficient damping effect to the closure member 10-plate 11 system; this can avoid the provision of additional components to form another damping chamber;

With the valve at rest, fluid leakage between the feed line P and the discharge line T is very little and allows the hydraulic motor with which the valve is connected to be held in position even under the action of a driving load;

The influence of flow forces and pressure losses is reduced;

Vibrations and instability of regulated pressure at low flow rates are eliminated.

In a preferred construction embodiment, the valve operation time may be adjusted by two or more calibrated throttles in series: the series arrangement of the two or more throttles allows them to be formed with calibrated holes of increasing diameters and be less exposed to clogging; an additional guarantee against clogging of the calibrated holes is given by the possibility of providing a steel music wire 7b therein. The use of two throttles also avoids any complication to valve component processing.

The invention claimed is:

1. A progressive hydraulic pressure relief valve (V, V') for controlling pressure peaks in hydraulic motors and hydraulic circuits, which is mounted within a body (1, 1b) of a hydraulic block for communication with a supply line (P, P') and a discharge line (T, T'), said pressure relief valve (V, V') comprising:
   a cartridge (6), said cartridge including internal chambers or internal chambers including a main spring chamber (C1) defined by an inner surface of the cartridge, said cartridge (6) having a ring of radial through holes (6a) and one or more holes (6b) for communication of the main spring chamber (C1) with the discharge line (T);
   a spring-holding plug (3) at an upper end of the cartridge (10);
   a closure member (10) having an outer surface and an axial through hole (10a), the outer surface of the closure member further defining the main spring chamber (C1), said closure member (10) being composed of a head (10b), a cylindrical surface (10c) and an end part (10d);
   a main spring (8) inside the cartridge;
   a piston (5) inside the cartridge, the piston (5) having a bottom surface and an axial through hole (5a), the bottom surface of the piston further defining the main spring chamber (C1);
   a setting spring (12) inside the cartridge and the spring holding plug (3);
   a spring plate (4) in the spring holding plug (3) at an end of the setting spring (12);
   a plate (11) with an axial through hole (11a) at an opposite end of the setting spring; and
   a chamber (C2) defined by the piston (5) and the spring-holding plug (3); said cartridge (6) having a ring of radial through holes (6a) and one or more holes (6b) for communication of the main spring chamber (C1) with the discharge line (T);
   wherein said pressure relief valve (V) has coupling surfaces between:
      the head (10b) of the closure member (10) and an edge (S1) of the cartridge (6),
      the surface (10c) of the closure member (10) and the interior of the cartridge (6),
      the end part (10d) of the closure member (10) and the hole (5a) of the piston (5), and
      the outer surface of the piston (5) and the interior of the cartridge (6)
   which are formed with geometric precision and sized to limit fluid leakage to less than 5 ml/min, at an operating pressure of the valve, said coupling surfaces being coaxial to ensure that friction during relative motion of the parts is negligible.

2. The pressure relief valve (V, V') as claimed in claim 1, wherein the end part (10d) of the closure member (10) has an annular groove (17) adapted for receiving a seal (16) having a low coefficient of friction, sliding within the corresponding piston (5).

3. The pressure relief valve (V, V') as claimed in claim 1, wherein a compensated flow-rate regulator is provided in the axial through hole (10a) of the closure member (10), and the compensated flow-rate regulator is sized to ensure a constant flow rate regardless of the pressure within the supply line (P) through the hole (10a).

4. The pressure relief valve (V, V') as claimed in claim 1, wherein said head (10b) of the closure member comprises a baffle (15).

5. The pressure relief valve (V, V') as claimed in claim 4, wherein the pressure relief valve further comprises:
   a chamber (C3) defined by the inner surface of the cartridge (6) and the head (10b) of the closure member (10) and the cylindrical surface (10c) of the closure member (10);
   wherein said chamber (C3), in combination with a geometry of the baffle (15) on the closure member (10) being capable of providing a damping effect for the closure member (10) and plate (11).

6. The pressure relief valve (V, V') as claimed in claim 1, wherein at least one throttle (7) and (9) is provided in the axial through hole (10a) of the closure member, said at least one throttle being adapted to allow adjustment of valve operation time using calibrated holes (7a and 9a).

7. A pressure relief valve (V, V') as claimed in claim 6, wherein said calibrated holes (7a, 9a) of the throttles (7, 9) are equipped with a steel music wire for preventing clogging.

8. The pressure relief valve (V, V') as claimed in claim 1, wherein two or more throttles (7 and 9) are provided in the axial through hole (10a) of the closure member, said throttles (7 and 9) being disposed in series to allow adjustment of the valve operation time using calibrated holes (7a and 9a).

9. The pressure relief valve (V, V') as claimed in claim 8, wherein said calibrated holes (7a, 9a) of the throttles (7, 9) are equipped with a steel music wire for preventing clogging.

10. A progressive hydraulic pressure relief valve (V, V') for controlling pressure peaks in hydraulic motors and hydraulic circuits, which is mounted within a body (1, 1b) of a hydraulic block for communication with a supply line (P, P') and a discharge line (T, T'), said pressure relief valve (V, V') comprising:
- a cartridge (6), said cartridge including internal chambers or internal chambers including a main spring chamber (C1) defined by an inner surface of the cartridge, said cartridge (6) having a ring of radial through holes (6a) and one or more holes (6b) for communication of the main spring chamber (C1) with the discharge line (T);
- a spring-holding plug (3) at an upper end of the cartridge (10);
- a closure member (10) having an outer surface and an axial through hole (10a), the outer surface of the closure member further defining the main spring chamber (C1), said closure member (10) being composed of a head (10b), a cylindrical surface (10c) and an end part (10d);
- a main spring (8) inside the cartridge;
- a piston (5) inside the cartridge, the piston (5) having a bottom surface and an axial through hole (5a), the bottom surface of the piston further defining the main spring chamber (C1);
- a setting spring (12) inside the cartridge and the spring holding plug (3);
- a spring plate (4) in the spring holding plug (3) at an end of the setting spring (12);
- a plate (11) with an axial through hole (11a) at an opposite end of the setting spring; and
- a chamber (C2) defined by the piston (5) and the spring-holding plug (3); said cartridge (6) having a ring of radial through holes (6a) and one or more holes (6b) for communication of the main spring chamber (C1) with the discharge line (T), wherein said pressure relief valve (V) has coupling surfaces between:
- the head (10b) of the closure member (10) and an edge (S1) of the cartridge (6),
- the surface (10c) of the closure member (10) and the interior of the cartridge (6),
- the end part (10d) of the closure member (10) and the hole (5a) of the piston (5), and
- the outer surface of the piston (5) and the interior of the cartridge (6)

which are formed with geometric precision and sized to limit fluid leakage to less than 5 ml/min, at an operating pressure of the valve, said coupling surfaces being coaxial to ensure that friction during relative motion of the parts is negligible, the pressure relief valve including the cartridge is mounted to a body (1b) formed with a cavity of a shape conforming the inner surface of the cartridge (6) where the inside parts slide directly on the body (1b) to allow operation of the valve (V), and the coupling surfaces between:
- the head (10b) of the closure member (10) and the edge (S2) of the body (1b),
- the surface (10c) of the closure member (10) and the interior of the body (1b),
- the end part (10d) of the closure member (10) and the hole (5a) of the piston (5),
- the outer surface of the piston (5) and the interior of the body (1b)

are formed with geometric precision and sized to limit fluid leakage to less than 5 ml/min, at the operating pressure of the valve, said coupling surfaces being coaxial to ensure that friction during relative motion of the parts is negligible.

* * * * *